United States Patent [19]

Engels

[11] Patent Number: 4,773,704
[45] Date of Patent: Sep. 27, 1988

[54] APPARATUS FOR ADJUSTING THE SEATS OF MOTOR VEHICLES

[75] Inventor: Bernd Engels, Remscheid, Fed. Rep. of Germany

[73] Assignee: Keiper Recaro GmbH. & Co. KG., Remscheid, Fed. Rep. of Germany

[21] Appl. No.: 930,252

[22] Filed: Nov. 12, 1986

[30] Foreign Application Priority Data

Nov. 16, 1985 [DE] Fed. Rep. of Germany ....... 3540727

[51] Int. Cl.⁴ .............................................. A47C 1/024
[52] U.S. Cl. ..................................... 297/362; 297/365
[58] Field of Search ........................ 297/362, 364, 365; 74/804, 553

[56] References Cited

U.S. PATENT DOCUMENTS

| | | | |
|---|---|---|---|
| 2,727,406 | 12/1955 | Opocensky | 74/553 X |
| 4,025,109 | 5/1977 | Klingelhofer | 297/362 |
| 4,131,033 | 12/1978 | Wright | 74/553 |
| 4,326,748 | 4/1982 | Brusasco | 297/362 |
| 4,453,767 | 6/1984 | Walk | 74/804 |
| 4,563,039 | 1/1986 | Jorg | 297/362 |
| 4,580,838 | 4/1986 | Schottker | 297/362 |

*Primary Examiner*—Francis K. Zugel
*Attorney, Agent, or Firm*—Peter K. Kontler

[57] ABSTRACT

Apparatus for adjusting various parts of the seat in a motor vehicle has first and second adjustable units which receive motion from discrete first and second rotary driving elements in the form of gears or clutch sections. The driving elements flank an axially movable disc which has teeth or claws movable into engagement with the teeth or claws of the one or the other driving element in response to depression of a pushbutton which is surrounded by a hand wheel serving to rotate the selected driving element by way of a hollow shaft which non-rotatably carries the disc and surrounds an actuating member which transmits motion from the pushbutton to the disc. A locking device operates between the shaft and a pin which is reciprocable with the disc to releasably hold the disc in torque-transmitting engagement with the selected driving element.

21 Claims, 4 Drawing Sheets

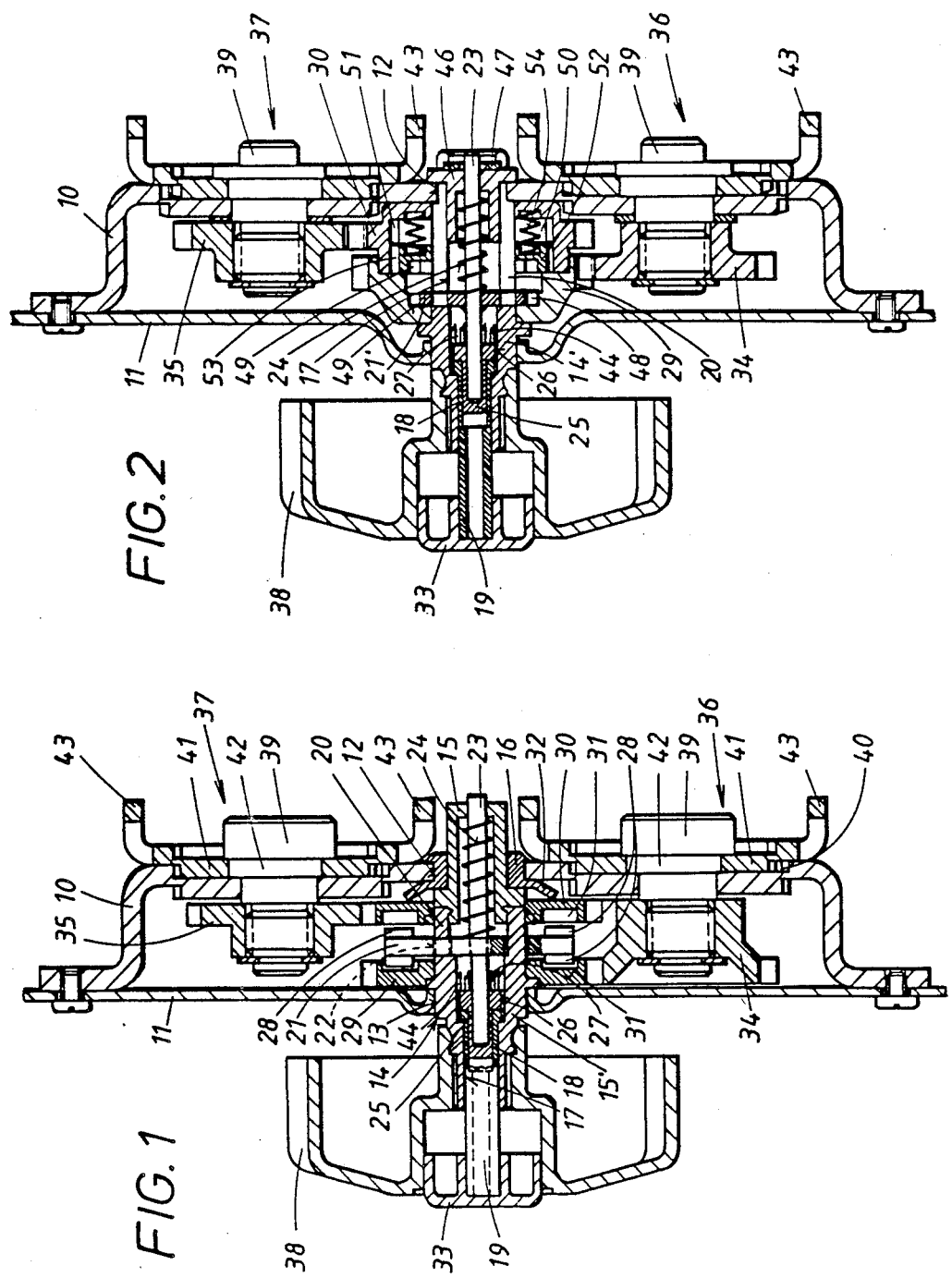

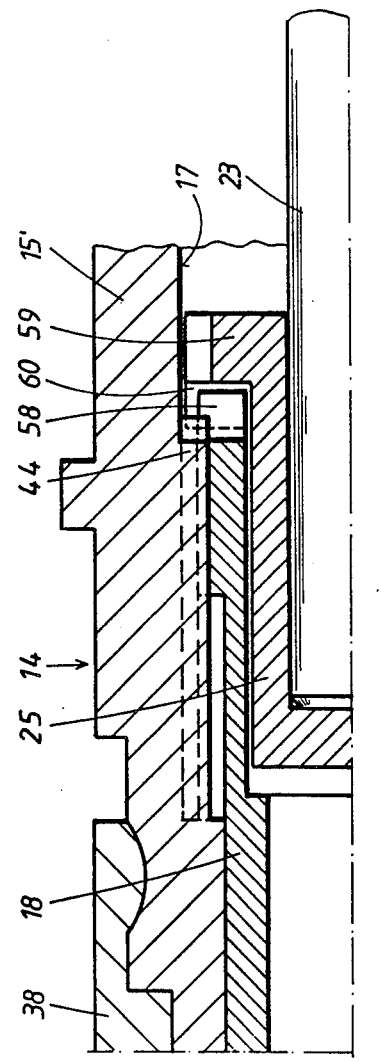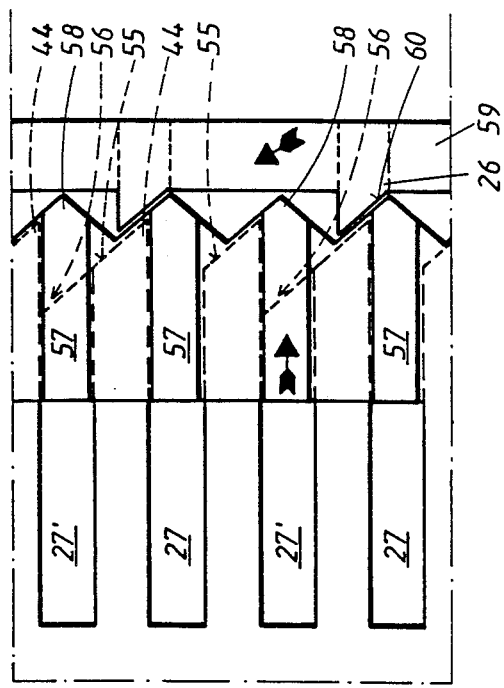

4,773,704

APPARATUS FOR ADJUSTING THE SEATS OF MOTOR VEHICLES

BACKGROUND OF THE INVENTION

The present invention relates to improvements in apparatus for adjusting mobile parts, especially for adjusting the seats of motor vehicles. More particularly, the invention relates to improvements in apparatus of the type disclosed in the commonly owned U.S. Pat. No. 4,563,039 granted Jan. 7, 1980 to Jörg for "Hinge joint for use in the seats of motor vehicles and the like" and in commonly owned copending patent applications Ser. Nos. 881,195 and 881,225 both filed July 2, 1986.

It is known to provide a seat adjusting apparatus for use in motor vehicles with two independently adjustable driven units each of which can transmit motion to a different part of the seat, e.g., to pivot the back of the seat in a clockwise or counterclockwise direction and to move the entire seat forwardly or backwards. It is also known to employ in such apparatus a hand wheel which can be rotated clockwise or counterclockwise to thereby impart corresponding movements to the selected adjustable (driven) unit. These apparatus further employ a coupling element which is movable between different positions in one of which the hand wheel can operate one of the adjustable units and in another of which the hand wheel can operate the other adjustable unit. The coupling element is movable between its positions by a discrete actuating device which is remote from the hand wheel. This presents problems because the hand wheel and the actuating device must be manipulated by different hands of the operator. In order to overcome such problems, the actuating device can be driven by a motor, e.g., an electric motor; however, this contributes to the bulk and cost of the apparatus.

OBJECTS AND SUMMARY OF THE INVENTION

An object of the invention is to provide an apparatus of the above outlined character wherein the adjustable units can be manipulated jointly or selectively by one and the same hand of the operator.

Another object of the invention is to provide a compact, simple and inexpensive but versatile and reliable apparatus which can be used to effect one or more adjustments of a single adjustable part or of several adjustable parts in or on the seat of a motor vehicle or the like.

A further object of the invention is to provide an apparatus wherein the means for initiating adjustments of one or more movable parts are simple and compact and are mounted in such a way that each thereof can be readily detected and its function determined without looking at the apparatus.

An additional object of the invention is to provide a seat adjusting apparatus for motor vehicles or the like which can be used as a superior substitute for heretofore known apparatus.

Another object of the invention is to provide a novel and improved method of manipulating movable parts by one hand in such a way that the operator can devote her or his attention to other tasks while in the process of carrying out one or more adjustments by way of the above outlined apparatus.

Still another object of the invention is to provide novel and improved means for transmitting torque from a hand wheel or the like to several adjustable parts of a mechanism for changing the inclination of the back of a seat, for adjusting the head rest, for raising or lowering the seat, for adjusting the arm rest and/or for moving the seat forwardly or backwards in the compartment of a passenger car, truck or another motor vehicle.

A further object of the invention is to provide novel and improved means for maintaining certain parts of the above outlined apparatus in selected positions.

The invention is embodied in an apparatus for transmitting motion to a plurality of adjustable units. The apparatus comprises a support (e.g., a dished part which is bolted or otherwise secured to a plate-like carrier in the seat of a motor vehicle), coaxial first and second driving elements rotatably mounted in the support, a rotary coupling element (e.g., in the form of a disc) disposed between the driving elements and movable axially between a first position of torque-transmitting engagement with the first driving element and a second position of torque-transmitting engagement with the second driving element, means for rotating the coupling element comprising a rotary adjusting member, and means for moving the coupling element between its first and second positions including an axially movable actuating member. One of the two members is at least partially surrounded by the other member. In accordance with a presently preferred embodiment of the invention, the adjusting member includes a hollow shaft and the actuating member is mounted in the shaft. The rotating means can further comprise a lever, a hand wheel or an analogous handgrip member which serves to rotate the adjusting member (preferably in clockwise and counterclockwise directions), and the moving means can further comprise a manually operable reciprocable member (such as a pushbutton or knob) for moving the actuating member axially. The handgrip member preferably surrounds the pushbutton or is immediately adjacent thereto so that the handgrip member and the reciprocable member can be manipulated by one and the same hand. This is of particular advantage if the apparatus is installed in the seat for the driver of a motor vehicle, i.e., the driver can manipulate the handgrip member and the reciprocable member with one hand while the other hand controls the steering wheel.

In accordance with one embodiment of the invention, the first and second driving elements respectively comprise first and second torque receiving means (e.g., annuli of gear teeth or claws) facing the respective sides of the coupling element, and the coupling element comprises at least one first torque transmitting portion (e.g., a jaw, claw or tooth) facing the first driving element and engageable with the first torque receiving means, and at least one second torque transmitting portion (e.g., a claw, jaw or tooth) facing the second driving element and engageable with the second torque receiving means.

The apparatus preferably comprises a tongue and groove (or splined) connection between the adjusting member and the coupling element to ensure that the coupling element will rotate in response to rotation of the adjusting member irrespective of the selected position of the coupling element. If the adjusting member is a shaft, it can be provided with a plurality of axially parallel tongues which extend into complementary axially parallel grooves or holes of the coupling element.

Means can be provided to bias the coupling element toward one of its positions. Such biasing means can comprise at least one resilient element which reacts against the adjusting member or directly against the support and bears against the coupling element.

As mentioned above, the moving means can comprise a manually depressible reciprocating member in the form of a knob or pushbutton which serves to move the actuating member in a first direction, a pin which is mounted in the adjusting member and is connected to the coupling element so that the latter shares the axial movements of the pin, and means for biasing the coupling element in a second direction counter to the first direction. The apparatus can further comprise means for releasably locking the coupling element in either of its positions. Such locking means can comprise a locking member which is installed between the pin and the actuating member. The locking means can further comprise cooperating internal projections provided in the adjusting member and external projections provided on the locking member. Such projections can be replaced with a heart cam and follower assembly of the type often used in ball point pens or in other types of implements or instruments to selectively maintain a ball point or another working end in one of two different positions.

Means can be provided to bias one of the driving elements axially toward the other driving element. The actuating member of such apparatus can comprise means for moving the coupling element axially toward the one driving element. The biasing means can comprise elastic prongs on a bearing for the adjusting member.

In accordance with another embodiment of the invention, the coupling element comprises a disc which is flanked by the driving elements and has an annulus of external teeth which are provided at its periphery. The first driving element of such apparatus comprises a first annulus of internal teeth which mate with the external teeth of the disc in the first position of the coupling element, and the second driving element of such apparatus has a second annulus of internal teeth which mate with the external teeth of the disc in the second position of the coupling element. One of the driving elements can comprise a first gear which is provided with the aforementioned second annulus of internal teeth, and the one driving element of such apparatus further comprises means (e.g., a set of coil springs) for biasing the first gear axially toward the coupling element. The one driving element preferably further comprises a second gear which mates with the first gear in each axial position of the first gear. It will be noted that each driving element can comprise at least one gear.

The pushbutton or knob which can be used to move the actuating member axially in one direction is preferably mounted in part within the confines of the hand wheel. This renders it possible to manipulate the handwheel and the pushbutton with the fingers of one and the same hand.

Each adjustable unit can comprise a rotary toothed input element and each of the driving elements can comprise a gear which is in permanent mesh with the input element of the respective adjustable unit. The input elements can drive gear-shaped or otherwise configurated output elements which, in turn, transmit motion to selected parts of an adjustable seat or any other device wherein several movable parts are to be moved individually or jointly.

In accordance with a presently preferred embodiment of the invention, the coupling element is movable in a first direction (e.g., toward its second position) by the actuating member of the moving means, and in a second direction (counter to the first direction and toward its first position) under the action of a coil spring or other suitable biasing means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of an apparatus which embodies one form of the invention and wherein the coupling element includes a disc with at least one claw at each of its sides;

FIG. 2 is a similar axial sectional view of a modified apparatus wherein the coupling element includes a spur gear;

FIG. 5 illustrates the structure of FIG. 3, with the locking means in an intermediate position;

FIG. 5a is a fragmentary developed view of certain parts which are shown in FIG. 5;

DESCRIPTION OF THE PREFERRED EMBODIMENTS

Figure 4:
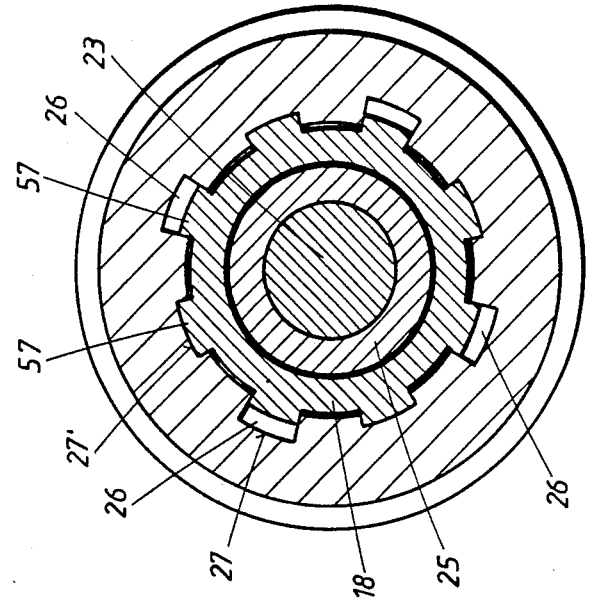
FIG. 4 is a transverse sectional view as seen in the direction of arrows from the line IV—IV of FIG. 3.

The apparatus which is shown in FIG. 1 comprises a shallow dished support 10 which is riveted, bolted, screwed or otherwise secured to a plate-like carrier 11. A circular opening 12 of the support 10 registers with a similar opening 13 in the carrier 11, and these openings receive an adjusting member in the form of a hollow shaft 14 which is rotatable in but cannot move axially relative to the parts 10 and 11.

The shaft 14 comprises two coaxial portions including a hollow cylindrical first portion 15' and a sleeve-like cupped second portion 15 which latter is coaxial with and is connected to the first portion 15'. The second portion 15 is rotatable in a sleeve bearing 16 which is received in the opening 12 of the support 10. The first portion 15' of the adjusting shaft 14 has an axial bore 17 which includes three sections having different diameters. The smallest-diameter section of the bore 17 is remotest from and the maximum-diameter section of such bore is nearest to the sleeve-like second portion 15. The smallest-diameter section of the bore 17 receives the hollow tubular portion 18 of an axially movable depressible actuating member 19 (shifting sleeve) which is secured to a reciprocable (depressible) pushbutton or knob 33 surrounded by a rotatable handgrip member here shown as a hand wheel 38. The right-hand end of the tubular portion 18 extends into the medium-diameter section of the bore 17. That part of the first portion 15' of the shaft 14 which is disposed between the support 10 and the carrier 11 and defines the maximum-diameter section of the bore 17 has an annulus of axially parallel prongs or tongues 20 which are equidistant from each other (as seen in the circumferential of the first portion 15′) and extend into complementary recesses or grooves 22 of a disc-shaped coupling element 21. Thus, the portion 15′ of the adjusting shaft 14 shares all angular movements of the disc-shaped coupling element 21 and vice versa. The coupling element 21 is secured to and shares the axial movements of an elongated pin or stud 23 which is coaxial with and is received in the shaft 14. The left-hand end portion of the pin 23 extends into the tubular portion 18 of the actuating member 19, and the right-hand end portion of the pin 23 extends into and outwardly beyond the bottom end wall of the cupped second portion 15 of the adjusting shaft 14. The pin 23 is movable axially of the shaft 14 and is biased in a direction to the left, as seen in FIG. 1, by a resilient element in the form of a coil spring 24 which reacts against the bottom wall of the shaft portion 15, which surrounds the pin 23 and which bears against the coupling element 21 to urge the latter axially in a direction toward the hand wheel 38 and pushbutton 33.

The median portion of the bore 17 in the shaft portion 15′ receives a sleeve-like locking or blocking member 25 (see also FIGS. 3 and 4) which surrounds the respective portion of the pin 23.

That part of the shaft portion 15′ which defines the medium-diameter section of the bore 17 has an annulus of equidistant axially parallel internal projections in the form of ribs 44 which alternate with axially parallel flutes 27 and 27′ (see FIG. 4). The ribs 44 extend radially inwardly to enter the radially outwardly extending flutes which are machined into or are otherwise formed in the external surface of the tubular portion 18. The tubular portion 18 has axially parallel external projections in the form of ribs 57 which alternate with the flutes for the ribs 44. The flutes 27 and 27′ receive axially parallel projections or ribs 26 on a collar 59 of the locking member 25. A portion of the locking member 25 is surrounded by the tubular portion 18 of the actuating member 19 (see particularly FIG. 3). The hand wheel 38 is non-rotatably mounted on the actuating member 19 and has a centrally located external socket for the reciprocable pushbutton 33 and a portion of the actuating member 19. The left-hand end portion of the locking member 25 is sealed, and this member surrounds the adjacent left-hand end portion of the reciprocable pin 23.

The disc-shaped coupling element 21 has two sets of torque-transmitting elements in the form of jaws, teeth or claws 28 which are adjacent its periphery and extend from both sides of the coupling element 21. The claws 28 form two rings in each of which the respective claws are equidistant from each other. The claws 28 of the left-hand set can enter the spaces between the complementary torque-receiving claws 31 in the adjacent inner side of a driving element 29 which serves to transmit torque to the input element 34 (e.g., a gear) of a first adjustable unit 36. The other set of claws 28 can engage the complementary torque-receiving claws 31 at the adjacent side of a second driving element 30 which can rotate the gear-shaped input element 35 of a second adjustable unit 37. The driving element 30 is movable axially along the adjusting shaft 14 in directions toward and away from the inner side of the support 10 and is biased in a direction to the left, as seen in FIG. 1, by elastic fingers 32 of the sleeve bearing 16. The fingers 32 yield in response to depression of the pushbutton 33, i.e., in response to axial movement of the actuating member 19 and of its tubular portion 18 toward the inner side of the support 10. Such axial movement of the actuating member 19 is necessary in order to engage the right-hand claws 28 of the coupling element 21 (which can be rotated by the hand wheel 38) with the complementary claws 31 of the driving element 30 for the adjustable unit 37. Axial movability of the driving element 30 (within certain limits) is desirable and advantageous because this reduces the likelihood of jamming and/or breakage of parts in response to axial movement of the coupling element 21 toward and into torque-transmitting engagement with the driving element 30.

The input elements 34, 35 of the adjustable units 36 and 37 constitute component parts of two wobble gearings and cause the output elements (41) of the respective adjustable units to rotate in response to rotation of the hand wheel 38. The latter rotates the input element 34 when the coupling element 21 mates with the driving element 29, and the input element 35 is or can be rotated by the hand wheel 38 when the coupling element 21 engages the driving element 30. The hand wheel 38 can rotate the adjusting shaft 14 which, in turn, can rotate the coupling element 21. The pushbutton 33 serves as a means for selecting the axial position of the coupling element 21, i.e., a position of engagement with the driving element 29 or a position of engagement with the driving element 30. The member 25 releasably locks the coupling element 21 in the selected position.

Each of the adjustable units 36 and 37 is actually a planetary transmission having a shaft 39 for the respective input element or gear 34 or 35. The input elements 34, 35 are non-rotatably connected to the respective shafts 39 which are rotatably journalled in the support 10. Each adjustable unit further comprises an internal gear 40 which is or can be an integral part of the support 10. The internal gears 40 are coaxial with the respective shafts 39 and mate with spur gears (output elements) 41 provided on eccentric portions 42 of the corresponding shafts 39. It is assumed that the number of teeth on each of the spur gears 41 is n−1 wherein n is the number of internal teeth on the respective gears 40. The addendum circle of each gear 41 is less, at least by the height of a gear tooth, than the dedendum circle of the respective internal gear 40. Such arrangement, combined with appropriate selection of the throw of the eccentric shaft portions 42, ensures that each revolution of a shaft 39 results in a displacement of the selected spur gear 41 through an angle corresponding to the pitch of its teeth. Each of the spur gears 41 constitutes the output element of the respective adjustable unit and has an outwardly extending projection or entraining portion 43 to transmit motion to a member or group of members which are to be adjusted thereby.

Reference may be had to the aforementioned commonly owned U.S. Pat. No. 4,563,039 which discloses a support with one or more integral internal gears having n teeth and arranged to mate with spur gears having n−1 teeth. The disclosure of this patent is incorporated herein by reference.

If an operator (e.g., the occupant of a seat in a motor vehicle) wishes to adjust the seat in a first way (e.g., by changing the inclination of the back), the pushbutton 33 is depressed to initiate a movement of the coupling element 21 into engagement with the driving element 30 so that the latter can rotate the output element 41 of the adjustable unit 37 which changes the inclination of the back forwardly or backwards, depending upon the direction of rotation of the hand wheel 38. If the operator wishes to carry out another adjustment (e.g., to move her or his seat forwardly or backwards), the pushbutton 33 is depressed again (for the purpose to be described in detail in connection with FIGS. 3–6) so as to cause the coupling element 21 to engage the driving element 29 whereby the latter can rotate the output element 41 of the adjustable unit 36 in response to a clockwise or counterclockwise rotation of the wheel 38 in order to move the seat forwardly or backwards.

Figure 3:
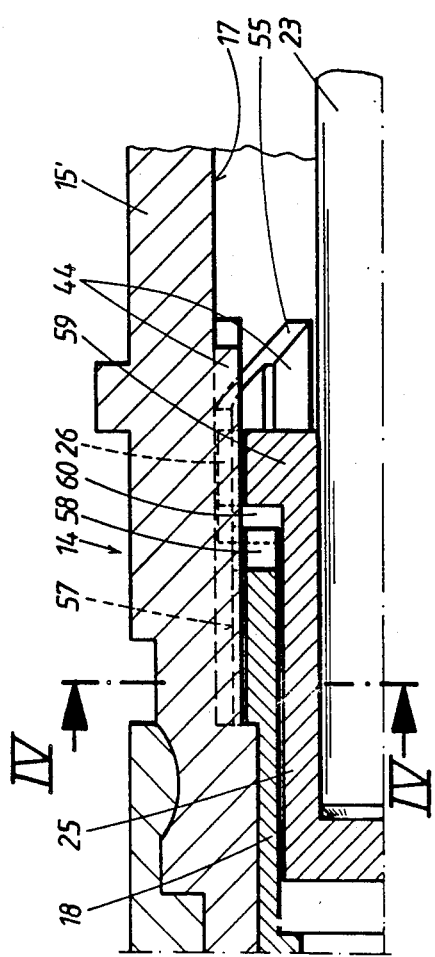
FIG. 3 is an enlarged view of a detail in FIG. 1, showing one position of the means for releasably locking the coupling element in a selected axial position.
Figure 3A:
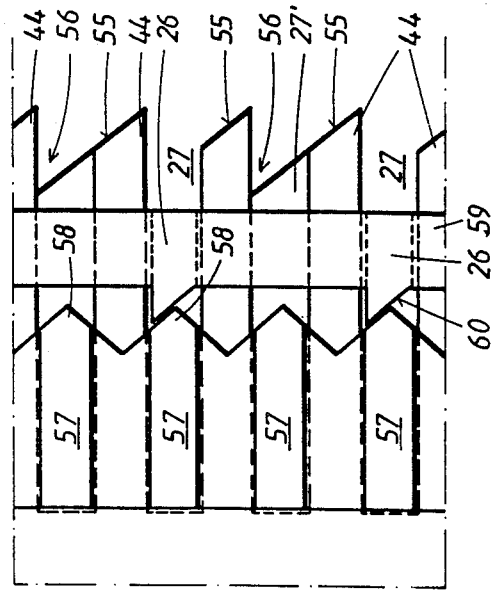
FIG. 3a is a fragmentary developed view of certain parts which are shown in FIG. 3.

FIGS. 3, 3a and 4 show the details of the means for moving the coupling element 21 axially so as to facilitate the engagement of its left-hand claws 28 with the claws 31 of the driving element 29 or the engagement of its right-hand claws 28 with the claws 31 of the driving element 30. As mentioned above, that part of the shaft portion 15' which defines the medium-diameter section of the bore 17 has a set of axially parallel projections or ribs 44 which alternate with axially parallel flutes 27 and 27'. In the embodiment of FIGS. 1 and 3–6a, the shaft portion 15' has eight ribs 44, four flutes 27 and four flutes 27'. The flutes 27 are deeper than the flutes 27', and the flutes 27' alternate with the flutes 27 in the circumferential direction of the shaft 14. The flutes 27, 27' and the ribs 44 are shown in the developed view of FIG. 3a. The front end faces 55 of the ribs 44 are inclined with reference to the axis of the shaft 14 in a manner as best shown in FIGS. 3 and 3a, i.e., they slope rearwardly in the circumferential direction of the shaft portion 15' toward the pushbutton 33 and hand wheel 38. The end faces 55 are aligned with the adjacent front end faces of those parts of the shaft portion 15' which are disposed radially outwardly of the shallower flutes 27'. This can be readily seen in FIG. 3a which further shows that each sloping front end face 55 and the adjacent front end face of the shaft portion which is located radially outwardly of the respective flute 27' define with the next-following rib 44 a pocket 56.

The tubular portion 18 of the actuating member 19 has the aforementioned external projections or ribs 57 which extend into the flutes 27 and 27' of the shaft portion 15' so that the tubular portion 18 can move axially of but cannot turn relative to the shaft 14. The external surface of the tubular portion 18 is further provided with pointed teeth 58 which alternate with the projections 57, as seen in the circumferential direction of the tubular portion 18. The number of teeth 58 matches that of the projections 57 and ribs 44. The inclination of the flanks of teeth 58 matches or closely approximates that of the front end faces 55 on the ribs 44.

The deeper flutes 27 of the shaft portion 15' can receive the axially parallel ribs 26 on the collar 59 of the locking member 25. The ribs 26 have inclined locking faces 60 whose inclination matches or approximates that of the front end faces 55 on the ribs 44. The locking faces 60 are adjacent the internal surface of the locking member 25 and project axially of the shaft 14.

FIG. 1 shows the locking member 25 and the shaft portion 15' in the same angular position as in FIGS. 3 and 3a, i.e., the left-hand claws 28 of the coupling element 21 mate with the claws 31 of the driving element 29. The four ribs 26 of the locking member 25 are received in the deeper flutes 27 of the shaft portion 15' and their locking faces 60 abut the adjacent flanks of pointed teeth 58 at the exterior of the tubular member 18. The straight ends of the eight external ribs 57 of the tubular member 18 are disposed at the ends of the respective flutes 27 and 27'. The parts 14, 18, 25 are held in such mutual positions by the coil spring 24 which reacts against the bottom wall of the shaft portion 15 and biases the coupling element 21 in a direction toward the pushbutton 33.

In order to index the coupling element 21 and to simultaneously move it axially, the pushbutton 33 is depressed to shift the tubular portion 18 of the actuating member 19 axially toward the support 10. The tubular member 18 shifts the locking member 25 in the same direction so that the coupling element 21 and the pin 23 move axially against the opposition of the coil spring 24. This results in complete expulsion of the ribs 26 on the collar 59 of the locking member 25 from the respective flutes 27 whereupon the locking member 25 moves axially in the opposite direction under the action of the coil spring 24 so that the ribs 26 slide along the pointed teeth 58 of the tubular portion 18 until the tips of the locking faces 60 reach the roots of the adjacent teeth 58. This entails an angular displacement of the locking member 25 through approximately 25 percent of the pitch of the pointed teeth 58. The new angular position of the locking member 25 is shown in FIGS. 5 and 5a.

Figure 6:
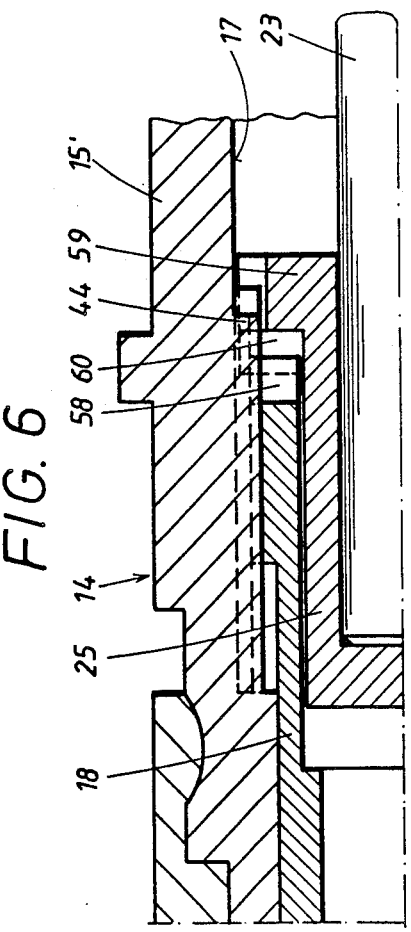
FIG. 6 illustrates the structure of FIG. 3 but with the locking means in another position.
Figure 6A:
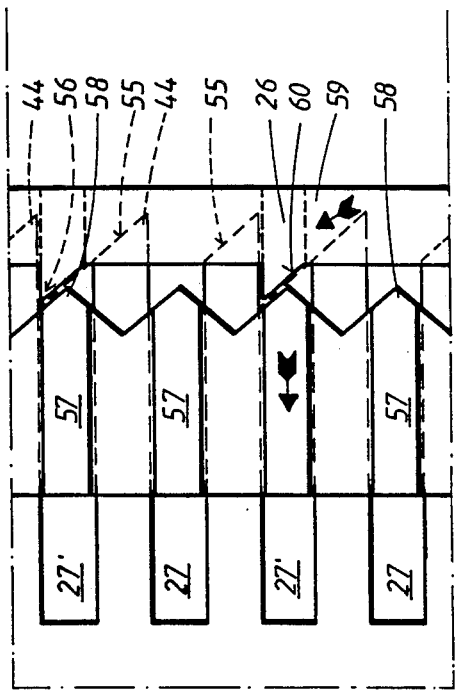
FIG. 6a is a fragmentary developed view of certain parts which are shown in FIG. 6.

If the operator thereupon relaxes the pressure upon the pushbutton 33, the spring 24 is free to push the pin 23 and the locking member 25 axially toward the hand wheel 38 so that the tips of locking faces 60 on the projections 26 of the collar 59 of the blocking member 25 slide into the adjacent pockets 56 and remain therein under the bias of the spring 24. This results in a retention of the locking member 25 in the second position which is shown in FIGS. 6 and 6a. The right-hand claws 28 of the coupling element 21 then mate with the claws 31 of the driving element 30.

In order to return the locking member 25 to the first position of FIGS. 1, 3 and 3a, the pushbutton 33 is depressed again so that the tubular portion 18 of the actuating member 19 moves toward the support 10 whereby its pointed teeth 58 push the ribs 26 of the locking member 25 forwardly to such an extent that the locking faces 60 of the ribs 26 are lifted (at least slightly) away from the tips of the ribs 44. This enables the spring 24 to cause the locking faces 60 of the ribs 26 to slide along the front end faces 55 of the ribs 44 and to enter the deeper flutes 27 as soon as the pressure upon the pushbutton 33 is relaxed or terminated. The spring 24 is then free to move the pin 23, the coupling element 21 and the locking member 25 axially back to the positions of FIGS. 1 and 3, 3a.

FIG. 2 shows a modified apparatus which employs a different coupling for transmission of torque to the driving members for the adjustable units 36 and 37. The adjusting shaft 14' is a one-piece member which has an axial bore 17 composed of three sections having different diameters. This adjusting shaft 14' extends through the plate-like carrier 11 as well as through the dished support 10. The median section of the bore 17 in the adjusting shaft 14' contains an annulus of inwardly extending equidistant projections or ribs 44 which alternate with flutes 27. The flutes 27 receive projections or ribs 26 which are provided on a collar of the sleeve-like locking member 25. The member 25 is indirectly mounted on the depressible knob 33 (which is mounted in the axial passage of the handwheel 38) with the interposition of an axially movable depressible actuating member 19 extending into the central bore of the knob 33. The locking member 25 is closed at one axial end and its end wall is contacted by the adjacent inner end of the reciprocable pin or stud 23 for the coupling element 21'. The pin 23 is rigidly connected to or is integral with the coupling element 21'. The maximum-diameter section of the bore 17 in the adjusting shaft 14' has several equidistant torque transmitting prongs or tongues 20 which are separated from each other by slots and extend into recesses or grooves of the coupling element 21' in order to transmit torque thereto. One end portion of the adjusting shaft 14' is closed by a sleeve 46 which serves as a guide for the pin 23 and as an abutment and is formed with projections extending into the slots between the torque transmitting portions 20. A split ring 47 on the outer end portion of the pin 23 abuts the outer side of the sleeve 46. A restoring or resetting coil spring 24 surrounds the pin 23 to operate between the sleeve 46 and the coupling element 21'. The latter is a disc having an annulus of radially outwardly extending torque-transmitting gear teeth 48. Such teeth can mate with the torque-receiving internal teeth 49 of the driving element 29 which constitutes an internal gear and can transmit torque to the input element 34 of the adjustable unit 36. The full set of external gear teeth 48 can be replaced with one or more radially outwardly extending projections which can transmit torque to the driving element 29 or 30. If the teeth 48 are replaced with a relatively small number of projections, such projections are preferably equidistant from each other.

The right-hand driving element is a composite gear including an internal gear 30 which surrounds the adjacent portion of the adjusting shaft 14' and is rotatable relative to the shaft 14', the same as the driving element 29 (except when engaged by the coupling element 21'). The gear 30 has an elongated hub which defines an annular chamber 50 for internal teeth 51 of the gear 30 as well as for an intermediate or second gear 52 which forms part of the right-hand driving element and is movable axially of the shaft 14' under the action, or against the opposition, of several coil springs 54. The intermediate gear 52 has external teeth 53 whose number matches that of the internal teeth 51 in the gear 30. The intermediate gear 52 is further provided with an internal space which has a circular outline and can receive the coupling element 21'. The space in the intermediate gear 52 contains internal torque-receiving teeth 49 which are integral arts of the gear 52 and can mate with the external teeth 48 of the coupling element 21'. The coil springs 54 bias the intermediate gear 52 in a direction to maintain its internal teeth 49 in mesh with the external teeth 48 of the coupling element 21'.

If the pushbutton 33 is depressed, the actuating member 19 and its tubular portion 18 are shifted axially toward the support 10 and the locking member 25 is compelled to share such movements of the member 19. The locking member 25 moves the pin 23 which, in turn, moves the coupling element 21' in the same direction. If the teeth 48 of the coupling element 21' register with the tooth spaces between the internal teeth 49 of the intermediate gear 52, the coupling element 21' is free to immediately engage with the intermediate gear 52, i.e., the teeth 48, 49 mate to enable the hand wheel 38 to rotate the intermediate gear 52 and the gear 30 in a clockwise or counterclockwise direction.

The projections or ribs 26 at the exterior of the collar of the locking member 25 are expelled from the flutes 27, which alternate with the ribs 44 of the adjusting shaft 14', in response to rightward movement of the locking member 25 (i.e., in response to depression of the pushbutton 33) whereby the stop faces (not referenced in FIG. 2) of the ribs 26 on the locking member 25 engage the front end faces of the adjacent ribs 44 on the shaft 14' and hold the coupling element 21' in the right-hand end position in which the teeth 48 of the element 21' are ready to rotate the driving element including the gears 52 and 30 and the input element 35 of the adjustable unit 37. The driving element including the gears 52 and 30 can be rotated (clockwise or counterclockwise) by the hand wheel 38 which transmits torque by way of the shaft 14' and coupling element 21'. The external teeth 53 of the intermediate gear 52 are in permanent mesh with the internal teeth 51 of the gear 30.

The construction of the adjustable units 36 and 37 in the apparatus of FIG. 2 is or can be the same as that of the corresponding adjustable units in the apparatus of FIG. 1.

If the operator thereupon desires to rotate the input element 34 of the adjustable unit 36, the pushbutton 33 is depressed to a certain extent so as to shift the coupling element 21' and the pin 23 axially against the opposition of the coil spring 24 whereby the intermediate gear 52 moves in a direction to the right to stress the coil springs 54 in the interior of the gear 30. The locking member 25 is then caused to change its angular position in a manner as described above in connection with FIGS. 1 and 3 to 6a so that the ribs 26 on the collar of the locking member 25 can reenter the flutes between the ribs 44 of the shaft 14'. When the pressure upon the pushbutton 33 is relaxed, the spring 24 is free to dissipate energy and to move the coupling element 21' axially back to the left-hand end position of FIG. 2 in which the teeth 48 of the coupling element 21' mate with the internal teeth 49 of the driving element 29. The apparatus is then ready to change the angular position of the input element 34 of the adjustable unit 36 in response to a clockwise or counterclockwise rotation of the hand wheel 38.

The illustrated means for moving the coupling element 21 or 21' axially into engagement with the driving element 29 or 30 and for locking the coupling element in the selected axial position constitutes but one of the devices which can be used for such purposes. For example, the coupling element 21 or 21' can be moved axially by a heart cam and by a suitable follower in a manner which is well known from the art of ball point pens, namely as a means for moving the cartridge of a ball point pen between an extended and a retracted position.

It is further within the purview of the invention to replace the illustrated adjustable (driven) units 36 and 37 with other types of adjustable units (e.g., with rack-and-pinion drives).

An important advantage of the improved apparatus is that the hand wheel 38 and the pushbutton 33 are sufficiently close to each other to be manipulatable by one and the same hand of the occupant of a seat or of the user of another device in which the apparatus is put to use. Furthermore, the configuration and mounting of the hand wheel 38 and pushbutton 33 are such that the operator can readily locate the pushbutton or the hand wheel without looking at such parts, and the operator immediately realizes the sequence in which the parts 33 and 38 must be manipulated in order to carry out a desired adjustment by way of the selected driving element. This is accomplished, at least in part, by the simple expedient of mounting a portion of or the entire actuating member 19 within the adjusting shaft 14 or 14'. It is also possible to reverse the positions of the parts 14 or 14' and 18, i.e., to mount the adjusting shaft within the confines of the actuating member 19 and/or its tubular portion 18. All the operator must remember is that the axial position of the coupling element 21 or 21' can be changed by depressing the pushbutton 33 and that actual adjustment of the output element 41 of the adjustable unit 36 or 37 is effected in response to rotation of the hand wheel 38.

The provision of a centrally located tongue and groove connection (20, 22) between the shaft 14 and the coupling element 21 or 21' contributes to simplicity, compactness and reliability of the motion transmitting connection between the hand wheel 38 and the coupling element.

The illustrated locking member 25 and other parts of the means for releasably holding the coupling element 21 or 21' in the one or the other position exhibits the advantage that the locking means can be actuated with the exertion of a small force (i.e., merely in response to depression of the pushbutton 33) regardless of whether the coupling element 21 or 21' happens to be in a position to transmit torque to the driving element 29 or in a position to transmit torque to the other driving element.

The embodiment of FIG. 2 exhibits the advantage that the radially outwardly extending torque-transmitting elements 48 of the coupling element 21' are even more likely to rapidly and predictably engage the internal teeth 49 of the driving element 29 or the internal teeth of the gear 52 of the other driving element than the claws 28 of the coupling element 21 which is used in the embodiment of FIG. 1. The provision of a driving element (FIG. 2) having two gears (30 and 52) which are in permanent mesh with one another and one (52) of which can yield axially against the opposition of suitable biasing means (54) contributes still further to the reliability and convenience of engagement between the coupling element 21' and the gear 52.

Instead of serving to change the inclination of the back of a seat in a motor vehicle, one of the adjustable units 36, 37 can be used to move the entire seat up or down. Other combinations of movements of various portions of or of an entire seat can be selected without departing from the spirit of the invention. For example, one of the adjustable units 36, 37 can be used to select the level and/or inclination of the arm rest or arm rests in a seat or to adjust the level and/or inclination of the head rest.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transmitting motion to a plurality of adjustable units, comprising a support; coaxial first and second rotary driving elements mounted in said support; a rotary coupling element disposed between said driving elements and movable axially between a first position of torque-transmitting engagement with said first driving element and a second position of torque transmitting engagement with said second driving element; means for rotating said coupling element comprising a rotary adjusting member fixed against axial movement; and means for moving said coupling element between said positions including an axially movable actuating member, one of said members at least partially surrounding the other of said members.

2. The apparatus of claim 1, wherein said adjusting member includes a hollow shaft and said actuating member is mounted in said shaft.

3. The apparatus of claim 1, wherein said rotating means further comprises a hand wheel which is arranged to rotate said adjusting member, said moving means further comprising a manually operable reciprocable member, such as a pushbutton, for moving said actuating member axially.

4. The apparatus of claim 1, wherein said first and second driving elements respectively have first and second torque-receiving means facing said coupling element, said coupling element having at least one first torque-transmitting portion facing said first driving element and engageable with said first torque-receiving means and at least one second torque transmitting portion facing said second driving element and engageable with said second torque-receiving means.

5. The apparatus of claim 4, wherein said coupling element includes a disc which is flanked by said driving elements.

6. The apparatus of claim 1, further comprising a tongue and groove connection between said adjusting member and said coupling element to rotate said coupling element in response to rotation of said adjusting member in each position of said coupling element.

7. The apparatus of claim 6, wherein said adjusting member includes a shaft having a plurality of axially parallel tongues and said coupling element has grooves for said tongues.

8. The apparatus of claim 1, further comprising means for biasing said coupling element toward one of said positions.

9. The apparatus of claim 8, wherein said biasing means comprises a resilient element reacting against said adjusting member or said support and bearing against said coupling element.

10. The apparatus of claim 1, wherein said moving means comprises a manually depressible member arranged to move said actuating member in a first direction, a pin mounted in said adjusting member and connected with said coupling element, and means for biasing said coupling element in a second direction counter to said first direction; and further comprising means for releasably locking said coupling element in either of said positions, including a locking member installed between said pin and said actuating member.

11. The apparatus of claim 1, further comprising means for biasing one of said driving elements axially toward said coupling element.

12. The apparatus of claim 11, wherein said actuating member includes means for moving said coupling element axially toward said one driving element.

13. The apparatus of claim 1, wherein said coupling element includes a disc having an annulus of external teeth at the periphery thereof, said first driving element having a first annulus of internal teeth mating with said external teeth in the first position of said coupling element, said second driving element having a second annulus of internal teeth mating with said external teeth in the second position of said coupling element.

14. The apparatus of claim 13, wherein one of said driving elements includes a gear having said second annulus of internal teeth, and means for biasing said gear axially toward said coupling element.

15. The apparatus of claim 14, wherein said one driving element further comprises a second gear mating with said first named gear in each axial position of said first named gear.

16. The apparatus of claim 1, wherein each of said driving elements comprises at least one gear.

17. The apparatus of claim 1, wherein said adjusting member comprises a hollow shaft rotatably mounted in said support and a hand wheel for rotating said shaft, said actuating member being reciprocably mounted in said shaft and said moving means further comprising a pushbutton movably mounted in said hand wheel and arranged to move said actuating member axially.

18. The apparatus of claim 1, wherein each adjustable unit comprises a rotary toothed input element and each of said driving elements comprises a gear, each of said gears being in permanent mesh with a different one of said input elements.

19. The apparatus of claim 1, wherein said coupling element is movable relative to said adjusting member in a first direction under the action of said actuating member and said moving means further comprises means for biasing said coupling element in a second direction counter to said first direction.

20. Apparatus for transmitting motion to a plurality of adjustable units, comprising a support; coaxial first and second rotary driving elements mounted in said support; a rotary coupling element disposed between said driving elements and movable axially between a first position of torque-transmitting engagement with said first driving element and a second position of torque-transmitting engagement with said second driving element; means for rotating said coupling element comprising a rotary adjusting member which includes a hollow shaft; means for moving said coupling element between said positions including an axially movable actuating member mounted in said shaft; and means for releasably locking said coupling element in either of said positions, including a locking member and cooperating internal projections provided in said adjusting member and external projections provided on said locking member.

21. Apparatus for transmitting motion to a plurality of adjustable units, comprising a support; coaxial first and second rotary driving elements mounted in said support; a rotary coupling element disposed between said driving elements and movable axially between a first position of torque-transmitting engagement with said first driving element and a second position of torque-transmitting engagement with said second driving element; means for rotating said coupling element comprising a rotary adjusting member; means for moving said coupling element between said positions including an axially movable actuating member, one of said members at least partially surrounding the other of said members, and said moving means further including a manually depressible member arranged to move said actuating member in a first direction, a pin mounted in said adjusting member and connected with said coupling element, and means for biasing said coupling element in a second direction counter to said first direction; and means for releasably locking said coupling element in either of said positions, including a locking member installed between said pin and said actuating member and cooperating internal projections provided in said adjusting member and external projections provided on said locking member.

* * * * *